US011867558B2

(12) United States Patent
Barkhurst et al.

(10) Patent No.: US 11,867,558 B2
(45) Date of Patent: Jan. 9, 2024

(54) SELF-HOMING OPTICAL DEVICE (71) Applicant: MKS TECHNOLOGY, INC., Centennial, WY (US)

(72) Inventors: Danial Clark Barkhurst, Laramie, WY (US); Sean Patrick Woodward, Laramie, WY (US); Keith Thompson Carron, Centennial, WY (US); Shane Alan Buller, Laramie, WY (US)

( * ) Notice: Subject to any disclaimer, the term of this patent is extended or adjusted under 35 U.S.C. 154(b) by 857 days.

(21) Appl. No.: 16/485,686

(22) PCT Filed: Feb. 13, 2018

(86) PCT No.: PCT/US2018/018049
§ 371 (c)(1),
(2) Date: Aug. 13, 2019

(87) PCT Pub. No.: WO2018/148747
PCT Pub. Date: Aug. 16, 2018

(65) Prior Publication Data
US 2020/0056938 A1 Feb. 20, 2020

Related U.S. Application Data (60) Provisional application No. 62/458,553, filed on Feb. 13, 2017.

(51) Int. Cl.
*G01J 3/02* (2006.01)
*G01J 3/44* (2006.01)
*G02B 7/182* (2021.01)

(52) U.S. Cl.
CPC ......... *G01J 3/0208* (2013.01); *G01J 3/0289* (2013.01); *G01J 3/44* (2013.01); *G02B 7/1822* (2013.01); *G02B 7/1827* (2013.01); *G01J 3/0218* (2013.01)

(58) Field of Classification Search
CPC .......... G01J 3/0208; G01J 3/44; G01J 3/0289; G02B 7/1821–1827
USPC .......................... 359/212.1–214.1, 872, 877
See application file for complete search history.

(56) References Cited

U.S. PATENT DOCUMENTS

| 3,027,807 | A | * | 4/1962 | Barcus | B60R 1/072 359/873 |
| 4,151,757 | A | * | 5/1979 | Pitrat | B60R 1/072 359/876 |
| 4,157,861 | A | * | 6/1979 | Davies | G02B 7/1821 359/876 |
| 4,540,252 | A | * | 9/1985 | Hayashi | B60R 1/025 74/567 |

(Continued)

*Primary Examiner* — Ricky D Shafer
(74) *Attorney, Agent, or Firm* — FisherBroyles, LLP; Thomas J. Osborne, Jr.

(57) ABSTRACT

Optical systems have uses, such as in spectrometers, for directing a beam. A spectrometer, for example, utilizes an optical system for directing an incident beam toward a sample and receiving a spectroscopy signal from the sample. In various implementations, for example, an optical system may be further configured to move a beam with respect to a target, such as a sample, and still provide a home position where the beam is directed in a stationary configuration. A self-homing (e.g., self-centering) optical system may provide a "home" position in which the beam is directed in a first stationary mode while still allowing a focused beam to be moved with respect to a target in a second dynamic mode.

7 Claims, 10 Drawing Sheets

(56) References Cited

U.S. PATENT DOCUMENTS

| | | | | | |
|---|---|---|---|---|---|
| 4,750,486 | A | * | 6/1988 | Butler | G02B 7/1827 359/224.1 |
| 4,770,522 | A | * | 9/1988 | Alten | B60R 1/072 359/873 |
| 5,568,326 | A | * | 10/1996 | Yoshida | B60R 1/072 248/478 |
| 5,668,655 | A | * | 9/1997 | Schweizer | G02B 7/1821 359/872 |
| 6,947,191 | B2 | * | 9/2005 | Chen | G03B 21/28 359/872 |
| 7,388,700 | B1 | * | 6/2008 | Odhner | G02B 7/1821 359/224.1 |
| 2001/0033438 | A1 | * | 10/2001 | Kling | B60R 1/087 359/603 |
| 2003/0234596 | A1 | * | 12/2003 | Johansson | H02N 2/0015 310/328 |
| 2014/0104611 | A1 | * | 4/2014 | Watson | G01J 3/06 356/326 |

* cited by examiner

SELF-HOMING OPTICAL DEVICE

CROSS-REFERENCE TO RELATED APPLICATIONS

This application claims the benefit of U.S. provisional patent application No. 62/458,553 entitled "Self-Centering Raster" filed on Feb. 13, 2017, which is incorporated by reference in its entirety as though fully set forth herein.

This application is also related to U.S. application Ser. No. 13/221,899 filed Aug. 31, 2011 and issued as U.S. Pat. No. 8,988,678 (the '678 patent) and U.S. patent application Ser. No. 13/907,812 filed on May 31, 2013 (the '812 application). The '678 patent and the '812 application are both hereby incorporated by reference in their entirety as though fully set forth herein.

BACKGROUND

The present disclosure relates to a self-centering optical raster, such as a self-homing or self-centering optical raster, such as for a spectrometer.

SUMMARY

Optical systems have uses, such as in spectrometers, for directing a beam. A spectrometer, for example, utilizes an optical system for directing an incident beam toward a sample and receiving a spectroscopy signal from the sample. In various implementations, for example, an optical system may be further configured to move a beam with respect to a target, such as a sample, and still provide a home position where the beam is directed in a stationary configuration. A self-homing (e.g., self-centering) optical system may provide a "home" position in which the beam is directed in a first stationary mode while still allowing a focused beam to be moved with respect to a target in a second dynamic mode.

In various implementations described herein, a spectrometer (e.g., a Raman or luminescence (e.g., fluorescence, phosphorescence, chemiluminescence) spectrometer) is provided that is configured to move an incident beam relative to a target, such as a sample. In various implementations, the Although particular types of spectrometers are described herein (e.g., Raman and fluorescent), these are merely examples of spectrometers that may be used in a similar manner to move a focused beam across a sample to provide a larger sampling area while maintaining spectral resolution of the spectrometer.

In one implementation, for example, a self-homing (e.g., self-centering) optical system is provided. In this particular implementation, the optical system includes a reflective surface coupled to a motor configured to move the reflective surface relative to an optical beam in a first mode such that the beam is moved relative to a target in a first mode and to direct the beam in an at least generally consistent orientation relative to the target in a second mode.

In another implementation, a Raman, fluorescence or other spectrometer moves (e.g., rasters) a focused beam across a surface of a tagged target. In one variation, for example, the spectrometer averages the signals received from the sample. As described in the attached appendix, the averaged signals received from an excitation beam rastered across a sample can be used to detect a concentration of a tag or other detectable element dispersed within a heterogeneous sample. Thus, if a concentration of a sample (e.g., a tagged paint) is known, an averaged spectrometer signal can be used to detect if the sample has been diluted from the known concentration.

The foregoing and other aspects, features, details, utilities, and advantages of the present invention will be apparent from reading the following description and claims, and from reviewing the accompanying drawings.

DETAILED DESCRIPTION

A spectrometer (e.g., a Raman or luminescence (e.g., fluorescence, phosphorescence, chemiluminescence) spectrometer) is provided that reduces interference caused by a material disposed adjacent (directly or indirectly adjacent) and/or proximate (e.g., in close proximity) to a sample of interest. In various implementations, the material causing interference with a spectroscopy signal of a sample of interest may include a container (e.g., a test tube, plastic container, etc.) or another material located proximate (e.g., in close proximity) to the sample of interest. Although particular types of spectrometers are described below (e.g., Raman and fluorescent), these are merely examples of spectrometers that may be used in a similar manner to move a focused beam across a sample to provide a larger sampling area while maintaining spectral resolution of the spectrometer.

In one implementation, for example, a relatively low-cost, handheld Raman (or other) spectrometer is provided that provides rapid authentication (e.g., a point-and-shoot method requiring<10 sec) of SERS-active targets (e.g., fibers). The spectrometer, for example, can use a programmable, on-board taggant matching capability. In various implementations, this instrument can be used for contact detection and/or standoff detection of SERS-active materials (e.g., textile substrates from a distance of, for example, 0-2 meters).

In another implementation, a fluorescence (or other) spectrometer rasters (or otherwise moves) a focused beam across a surface of a tagged target. In one variation, for example, the spectrometer averages the signals received from the sample. As described in the attached appendix, the averaged signals received from an excitation beam rastered across a sample can be used to detect a concentration of a tag or other detectable element dispersed within a heterogeneous sample. Thus, if a concentration of a sample (e.g., a tagged paint) is known, an averaged spectrometer signal can be used to detect if the sample has been diluted from the known concentration.

Figure 1:
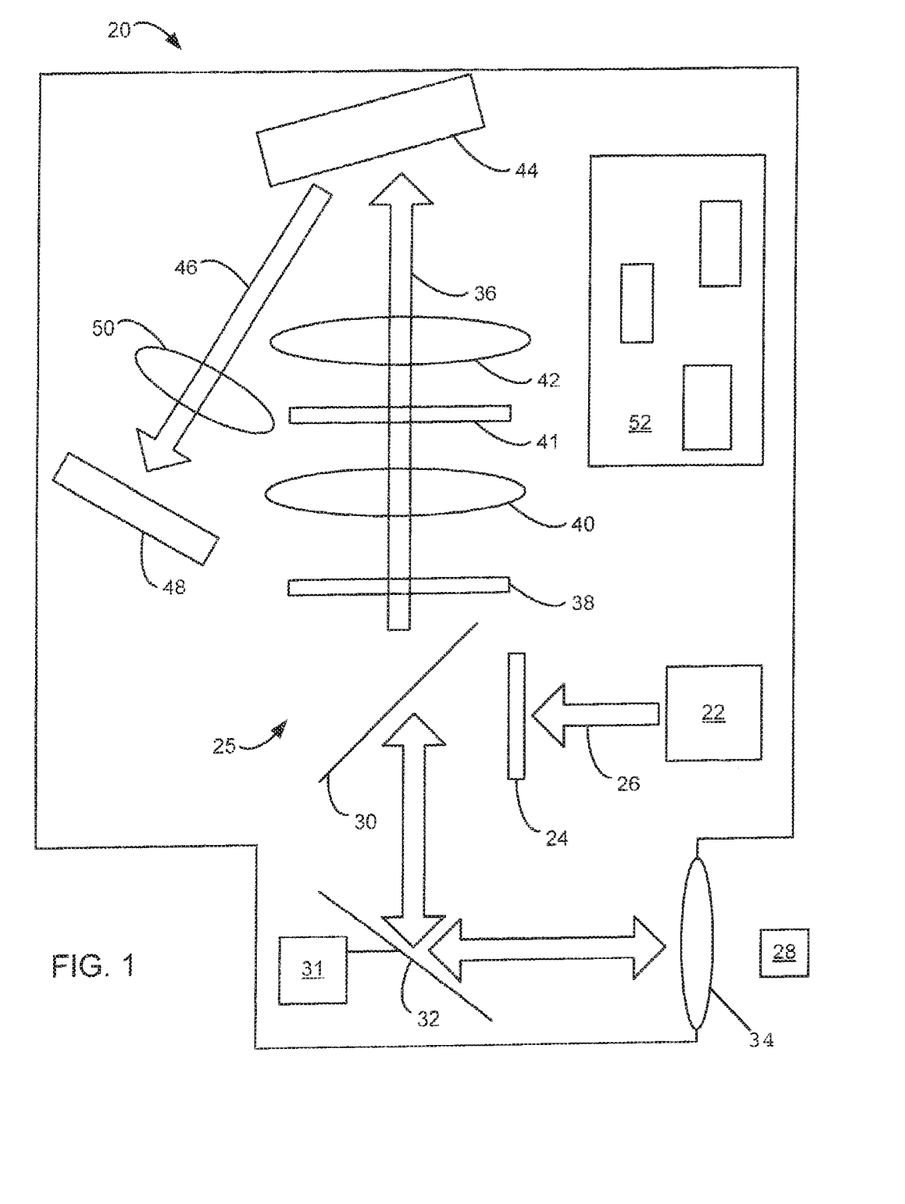
FIG. 1 shows a schematic diagram of an example implementation of a spectrometer configured to move a focused beam across a surface of a target.

FIG. 1 shows an example embodiment of a spectrometer 20 configured to move a focused beam across a surface of a target (e.g., a sample). Although the particular example shows a Raman spectrometer, other types of spectrometers, such as a luminescence spectrometer, could readily be designed based on the description herein. As shown in FIG. 1, the spectrometer 20 comprises an excitation source 22. In a Raman spectrometer, for example, the excitation source 22 typically comprises a laser light source. In one embodiment, for example, the excitation source 22 comprises a diode laser. A diode laser, for example, is capable of providing a plurality of wavelengths from the excitation source 22. The spectrometer 20 further comprises a filter 24. The filter 24 filters the output of the excitation source 22, such as removing spurious emissions from the excitation source 22.

The spectrometer 20 further comprises an optical system 25. The optical system 25 directs the incident beam 26 toward a sample 28 and receives a spectroscopy signal from the sample 28. In the embodiment shown in FIG. 1, for example, the optical system 25 comprises a dichroic beam-splitter mirror 30. However, the incident beam 26 may be directed at sample 28 without any intervening instrument components located in the path of incident beam 26. The incident beam 26 also may be directed at a mirror, a holographic transmissive element, a mirror formed with a hole in the mirror or any other means for directing an incident beam known in the art.

The optical system 25 further comprises a means for moving the incident beam across a surface of the sample 28. In one embodiment, for example, an actuator assembly 31 moves (e.g., vibrates) one or more element of the optical system 25 (e.g., a movable mirror 32) to move a focused beam across a surface of the sample 28. The actuator assembly 31, for example, may control the movable mirror 32 to move a focused incident beam 26 across a surface of the sample 28. The actuator assembly 31, for example, may control the movable mirror 32 to move the incident beam in any path or pattern across the surface of the sample 28. In one implementation, for example, the actuator assembly 31 may control the movable mirror 32 in such a manner as to trace one or more line, circle, elliptical or other paths across the surface of the sample. FIGS. 2 through 10, described below, describe a number of example actuator assemblies 31 for use in the spectrometer 20.

The incident beam 26 may further be directed through a lens 34. In one embodiment, the lens 34 comprises a focusing lens in the path of the incident beam 26. The focusing lens couples the incident beam 26 with the sample 28 and collects the spectroscopy signal (e.g., Raman scattered light) from the sample. In another embodiment, more than one lens 34 may be located in the path of the incident beam 26 before the incident beam 26 contacts the sample 28.

In various embodiments, the spectrometer 20 may include other optical elements for directing an incident beam 26 toward a sample and collecting a spectroscopy signal from the sample. The optical system of the spectrometer 20, for example, may include elements such as a collimated beam tube or a fiber optic waveguide. See, e.g., U.S. Pat. No. 7,403,281 for examples of collimated beam tubes or fiber optic waveguides that may be used in optical systems of various spectrometers.

Although FIG. 1 shows the actuator assembly 31 and movable mirror disposed interior to a housing of the spectrometer 20 and interior to the lens 34, other embodiments are also contemplated in which the actuator assembly 31 and/or movable mirror 32 are disposed external to the housing of the spectrometer 20 and/or external to the lens 34 (e.g., disposed in an optical path between the lens 34 and the sample 28). For example, the incident beam 26 may be focused by the lens 34 onto a surface of the movable mirror and reflected towards the sample by the mirror 32. Similarly, a collimated lens 34 may be used to direct the incident beam toward the movable mirror (e.g., a focusing mirror) that redirects and focuses the incident beam toward the sample 28.

The incident beam 26 induces or generates on contact with the sample 28 a spectroscopy signal to be detected by the spectrometer 20. In Raman spectroscopy, for example, the incident beam 26 induces or generates on contact with the sample 28 scattered radiation having an energy differential different from, and one or more wavelengths different than, the incident radiation 26, or the Raman shift that, for convenience, is described in this document as a Raman beam. As stated above, and as shown in FIG. 1, in one embodiment the spectrometer 20 comprises a beam-splitter, such as a dichroic beam-splitter mirror 30. The spectroscopy signal 36 (e.g., Raman beam) is directed back through the lens 34 and the dichroic beam-splitter mirror 30 in a 180 degree back-scatter geometry. Neither the incident beam 26 nor the spectroscopy signal 36 need be co-linear. In the embodiment shown in FIG. 1, however, the spectroscopy signal 36 passes back through the dichroic beam-splitter mirror 30 and then through a filter element 38. In one embodiment, the filter element 38 comprises a long pass filter that removes extraneous radiation (e.g., from the light source 22 or another source) prior to dispersing the spectroscopy signal 36 into a spectrum. Alternatively, the filter element 38 may comprise a notch filter, or any other filter that is capable of rejecting elastically scattered radiation.

The spectroscopy signal 36 may further pass through an input focusing lens 40 that focuses the spectroscopy signal 36 to a point at a spatial filter 41. In one embodiment, for example, the spatial filter 41 comprises an aperture, slit or notch and is located at the focal point of the input focusing lens 40. The spatial filter 41 spatially filters the beam at the focal point of the input focusing lens.

The spectrometer 20 shown in FIG. 1 further comprises a collimating lens 42 that collimates the diverging spectroscopy signal 36 after it has passed through an aperture of the spatial filter 41 (e.g., an aperture, slit or notch). The collimating lens 42 further directs the re-collimated Raman beam toward a diffraction grating 44. The diffraction grating 44 comprises an optical element that divides a Raman beam into spatial separated wavelengths. The diffraction grating 44 further directs a divided Raman beam 46 toward a detector 48. The divided Raman beam 46 passes through a detector focusing lens 50 that focuses the spatially separated wavelengths of the divided Raman beam 46 onto the detector 48.

The detector 48 comprises a transducer that converts optical energy into an electrical signal. In one embodiment, for example, the detector 48 comprises an array of individual transducers that create an electrical pattern representing the spatially separated wavelengths of the Raman spectrum. A charge-coupled device (CCD) array, for example, may be used as the detector 48 in one embodiment of the invention. In another embodiment, an Indium-Gallium-Arsenide (InGaAs) detector 48. Other detectors known in the art may also be used within a spectrometer of the present invention.

The spectrometer 20 further comprises control electronics 52 for controlling the operation of the spectrometer 20. The control electronics 52, for example, may control the operation of the light source 22, the actuator assembly 31, the detector 48, temperature control elements (e.g., for the light source or detector), and data transfer to and/or from the spectrometer. In one embodiment, the control electronics 52 may be integrated onto a single PC board within a housing of the spectrometer. The control electronics 52 may also comprise one or more discrete component(s) and/or one or more integrated circuit component(s).

In one embodiment, the control electronics 52 may comprise a means for communicating with an external device. The means for communicating, for example, the means form communicating may comprise a wired or wireless communication port for communicating with an external computer, smartphone, personal data assistant (PDA), network or the like. A wired communication port, for example, may comprise a parallel, serial, universal serial bus (USB), FireWire.™., IEEE 1394, Ethernet, modem, cable modem or other wired communication port known in the art. A wireless communication port, for example, may comprise an antenna for wireless communicating with an external device, such as via and infrared, Bluetooth, IEEE 802.11a/b/g, IrDA, a wireless modem or other wireless communication port known in the art. The control electronics 52 may be powered from a battery for a portable device or may include a power input for receiving power from an external supply as known in the art. A battery or power supply circuit (e.g., a rectifier) may be located within a housing of the spectrometer 20.

In Raman spectroscopy, the spectrometer 20 operates to detect a Raman spectrum of a sample 28. In order to detect the Raman spectrum, the light source 22 is activated to generate an incident beam 26 of excitation radiation, such as generating a laser incident beam in a laser light source. In one embodiment, for example, the temperature of the light source 22 is controlled to control the output frequency of the incident beam 26 generated by the light source 22. The incident beam 26 of excitation radiation passes through the filter 24, which removes spurious emissions from the incident beam. The incident beam 26 is reflected off the beam-splitter mirror 30 toward the sample 28. The incident beam 26 is focused onto the sample 28 by the output focusing lens 34.

The incident beam 26 generates Raman scattered light from the sample 28. The Raman scattered light is received by the output focusing lens 34 and transmitted back through the beam-splitter mirror 30. In this embodiment, the beam-splitter mirror 30 passes the Raman scattered light through the mirror 30 to the filter 38. From the filter 38, the Raman scattered light passes through the input focusing lens 40 and is focused onto a spatial filter 41 such as an aperture, slit or notch. The Raman scattered light is spatially filtered and diverges toward the collimating lens 42. The collimating lens 42 collimates the diverging Raman scattered light and transmits the light to the diffraction grating 44, which divides the Raman scattered light into spatial separated wavelengths and directs the wavelengths towards the detector element 48. The spatially separated wavelengths of the Raman scattered light pass through the detector focusing lens 50 and are focused into a focused band of radiation that represents the spatially separated wavelengths of the Raman scattered light. The focused band of radiation is further directed by the detector focusing lens 50 onto the detector 48.

In this particular implementation, the detector 48 comprises an array of individual transducers that each generate an electrical signal corresponding to intensity of the radiation received at each of the individual transducers. The electrical signals generated at the individual transducers of the detector represent the spatially separated wavelengths of the Raman spectrum of the sample 28. The electrical signals are read from the detector by the control electronics 52. In one embodiment, for example, the spectrometer 20 may then present the Raman spectrum detected to a user such as via a display or indicator on the spectrometer itself. In another embodiment, the control electronics of the spectrometer 20 may comprise a look-up table stored in a data storage element (e.g., memory, tape or disk drive, memory stick or the like). In this embodiment, the control electronics 52 compares the signal from the detector with the values stored in the look-up table to determine a result of the Raman scan. The spectrometer 20 then presents the result to a user such as via a display or indicator on the spectrometer. The result, for example, may indicate the presence or absence of one or more chemicals or substances in the sample and may further indicate an amount or concentration of a chemical or substance detected by the spectrometer.

In other implementations, the detector 48 may comprise one or more individual transducers that rapidly scan for one or more anticipated spectral features (e.g., Raman features). An example such system is disclosed in U.S. patent application Ser. No. 13/161,485 entitled "Spectrometer" and filed by Carron et al. on Jun. 15, 2011, which is hereby incorporated herein by reference in its entirety for all that it teaches and suggests.

Figure 1A:
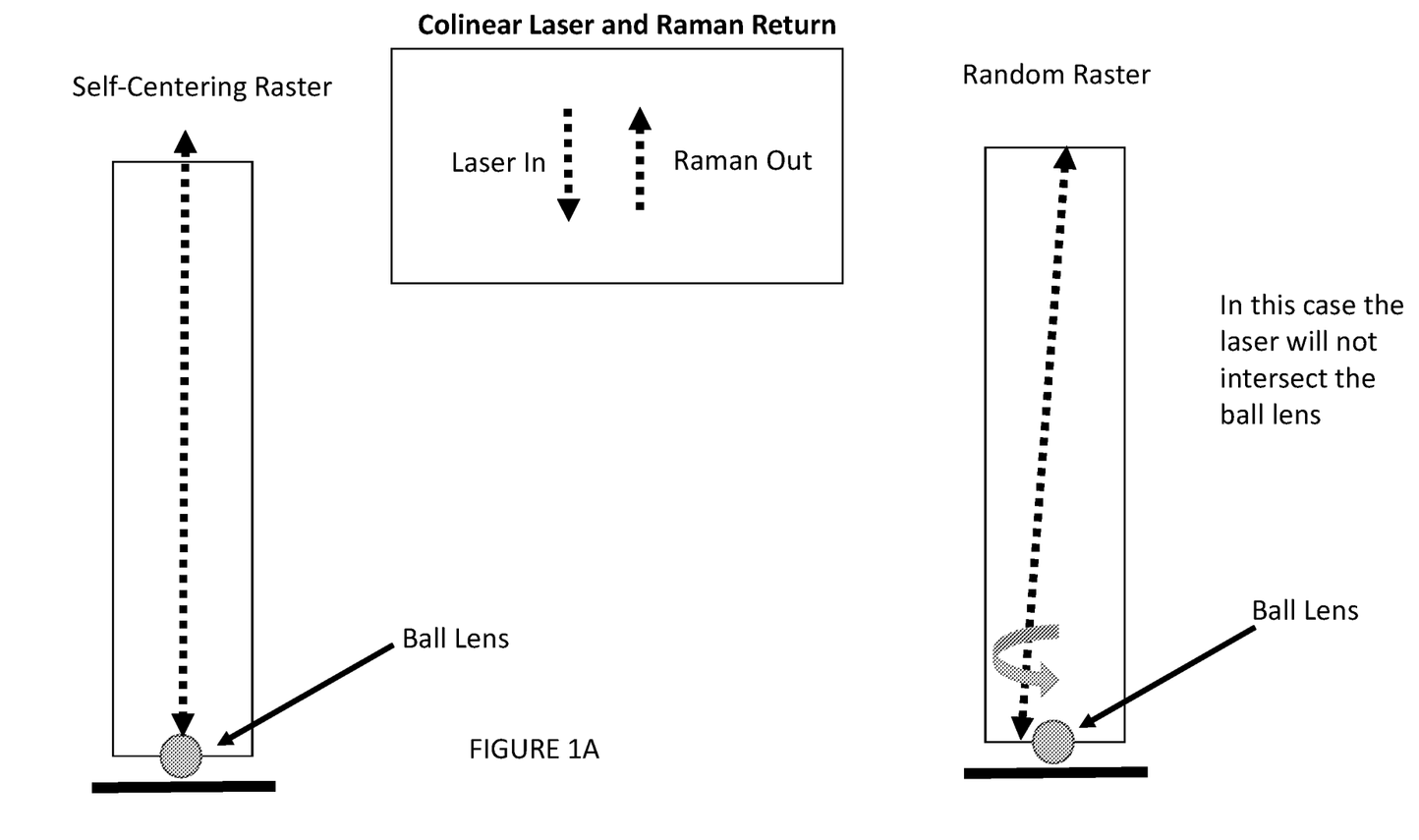
FIG. 1A shows a schematic diagram of example optical paths for two example raster systems.

FIG. 1A shows example optical paths for two example raster systems. In this particular example, the raster system may be configured to provide a dual mode in which an incident excitation beam is moved (e.g., rastered) relative to a target (e.g., sample) in a first Raster-On mode and is directed in a generally stationary manner relative to the target in a second Raster-Off mode. The example optical raster systems, for example, may be, but are not limited to, include raster systems for a collinear spectrometer (e.g., a collinear Raman spectrometer) in which an excitation incident beam is directed toward a sample and a return spectroscopy signal (e.g., Raman return signal) is collected by the common collinear optical system.

In the first example raster optical system, the system includes a "self-centering" or "self-homing" beam directing (e.g., raster) device in which an excitation incident beam is directed to an at least generally consistent centered or home position when a raster functionality of the raster optical system is inactive in the Raster-Off mode. In the example shown in FIG. 1A, for example, the raster optical system directs the incident excitation beam in a consistent manner in the Raster-Off mode through one or more optical components and is at least generally aligned with one or more optical components of the system, such as the ball lens shown.

In the second example random (or non-centering/homing) optical system, the raster device of the system may direct the incident excitation beam in any number of directions/angles through the optical system when the second Raster-Off mode is activated. In the second raster system, for example, a motor or other beam directing device of the optical system may be stopped in a number of different positions that may make the beam direction unpredictable when the device is switched from a first Raster-On mode to a second Raster-Off mode. Thus, as shown in FIG. 1A, the incident excitation beam may not be aligned with one or more components of the optical system, such as the ball lens shown.

Figure 1B:
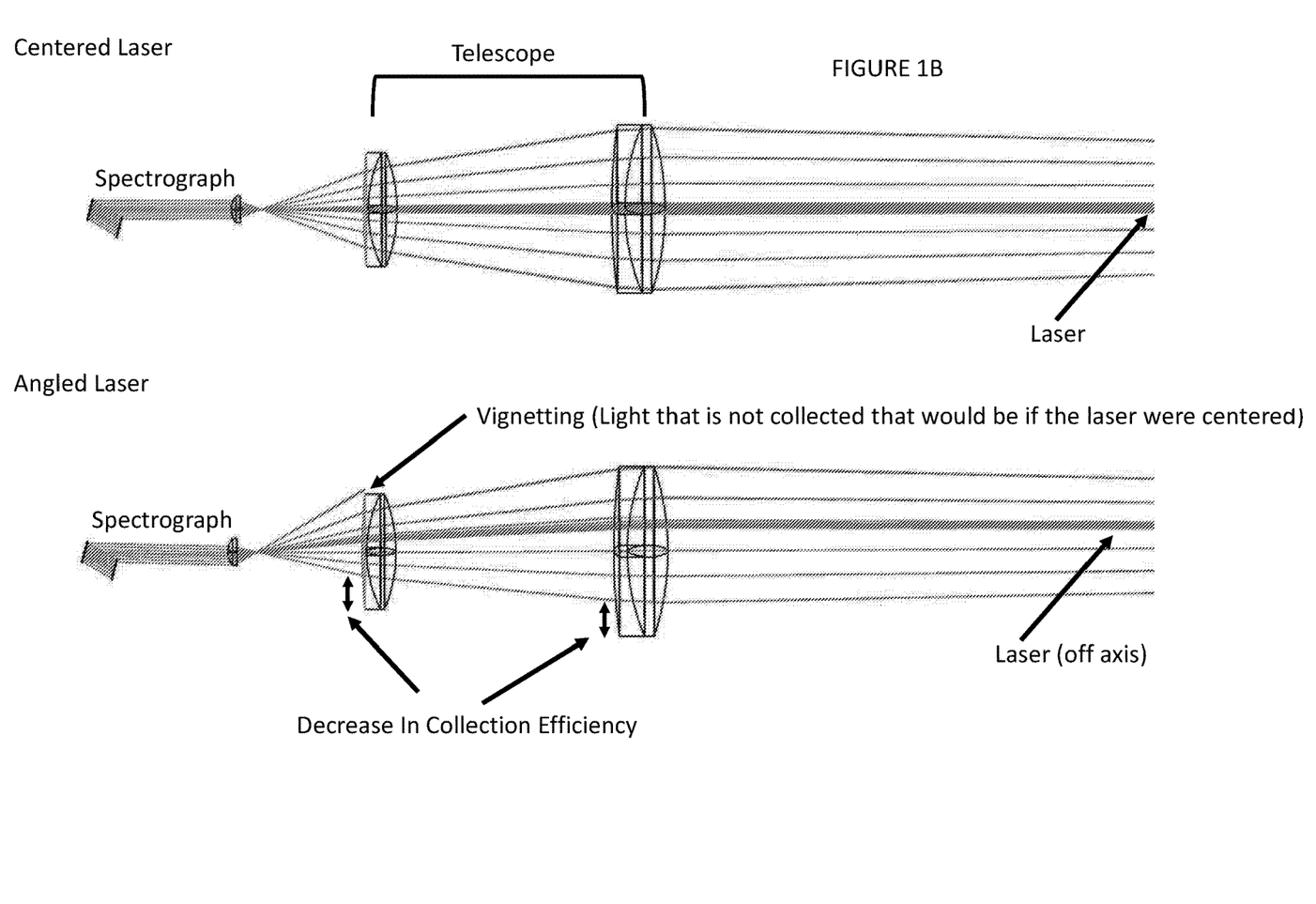
FIG. 1B shows a schematic diagram of various examples of collection patterns where the incident excitation beam is directed from a spectrometer through an external optical system.

FIG. 1B shows varying collection patterns where the incident excitation beam is directed from a spectrometer through an external optical system, such as the telescope optical system shown. In the first example in which the incident excitation beam is centered through the telescope optical system, the return collection pattern is captured more efficiently than in the second example where the incident excitation beam is allowed to be directed off-center, such as described above with respect to FIG. 1A. In this example, vignetting refers to light that is not collected in the second non-centered implementation and accounts for a decrease in collection efficiency.

Figure 2:
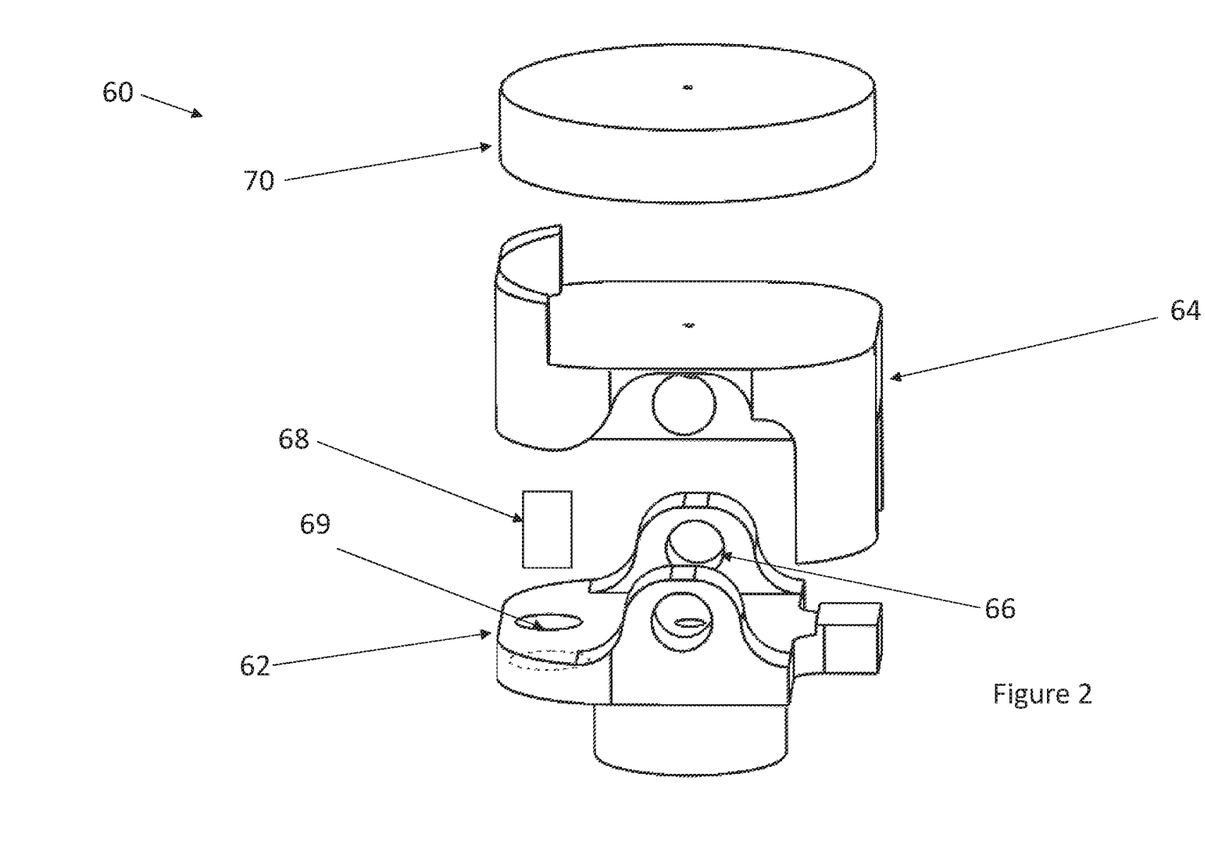
FIG. 2 shows a schematic diagram of an example actuator assembly configured to move an incident beam of a spectrometer across a surface of a sample.

FIG. 2 shows an example implementation of an actuator assembly 60 for moving an incident beam of a spectrometer across a surface of a sample. The actuator assembly 60, for example, may move one or more elements of an optical system of the spectrometer to scan, raster or otherwise move the incident beam across the surface of the sample.

In the particular implementation shown in FIG. 2, for example, the actuator assembly 60 comprises a base mount 62 that may be used, for example, to mount the actuator assembly 60 to a portion of a spectrometer (e.g., a housing, wand, probe, etc.). The base mount 62 is movably coupled to a mirror mount 64 that is configured to move (e.g., tilt) with respect to the base mount 62. In the particular implementation shown in FIG. 2, for example, the mirror mount 64 is configured to tilt with respect to the base mount via a hinge pin coupling 66, although other configurations are contemplated. In this example, a hinge pin couples the mirror mount 64 to the base mount 62 such that the mirror mount 64 is configured to tilt with respect to the base mount 62 along an axis of a hinge pin that is used to couple the mirror mount 64 to the base mount 62. A compression spring 68 may also be included in the actuator assembly 60 disposed between the base mount 62 and the mirror mount 64. In FIG. 2, for example, a recess 69 is provided in the base mount 62 and/or mirror mount 64 for housing a spring element 68 disposed between opposing surfaces of the base mount 62 and the mirror mount 64. The spring 68, in this implementation, may resist tilting of the mirror mount in one or more directions from a hinge axis (e.g., an axis of a hinge pin coupling the base mount to the mirror mount).

In the particular implementation shown in FIG. 2, for example, the actuator assembly 60 includes a mirror 70 or other reflective surface coupled to the mirror mount 64 (e.g., a 10 mm mirror). The mirror 70 or other reflective surface may be used to reflect an incident beam of excitation radiation from a light source of the spectrometer toward a sample. The mirror 70 or other reflective surface may similarly reflect a spectroscopy signal (e.g., a Raman signal) from the sample and direct it back toward a detector of the spectrometer via an optical system, such as shown in the spectrometer of FIG. 1.

In one particular implementation, the actuator assembly 60 further includes a raster motor coupled to the base mount and configured to spin the actuator assembly 60, such as via a motor shaft of the raster motor. The base mount, for example, may be coupled directly (e.g., disposed directly on the motor shaft) to the motor or may be coupled indirectly (e.g., via one or more intermediate members (e.g., gears) to the motor shaft.

Figure 3:
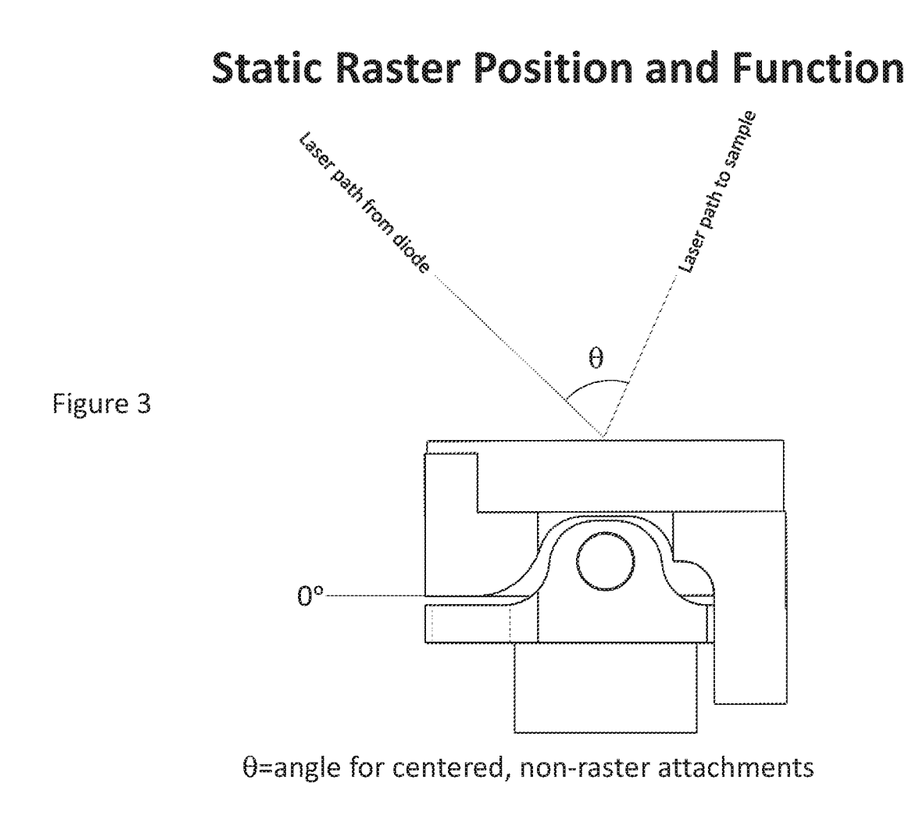
FIG. 3 shows a side assembled view of the example actuator assembly shown in FIG. 2.

FIG. 3 shows a side assembled view of the example actuator assembly 60 of FIG. 2. In FIG. 3, for example, the actuator assembly 60 is shown in a static position in which a raster motor is not turning and the spring of the actuator assembly 60 maintains the mirror mount and mirror in a generally level steady-state position. In this particular example, an angle between the base mount and an extension of the mirror mount is generally zero degrees (0°). Although the angle is shown with respect to the base mount and an extension of the mirror mount, the angle may also be referred to with respect to the reflective surface disposed on the mirror mount and may refer to an angle with respect to a stationary, steady-state position of the mirror mount (e.g., when the raster motor is not turning). In one implementation, a zero degree angle (or other steady state angle) places the mirror in a position to reflect the mirror surface in a position to reflect the incident beam of the spectrometer straight out of the spectrometer to the sampling area. This allows the use of limited collection optics and attachments that might be problematic with a rastering or moving incident beam being directed to a sampling area. In addition, the design shown in FIGS. 2 and 3 does not require the motor to stop at a specific location for use with a stationary focused sample area as the angle of the mirror surface is constant throughout the rotational field when the motor shaft is not rotating.

Figure 4:
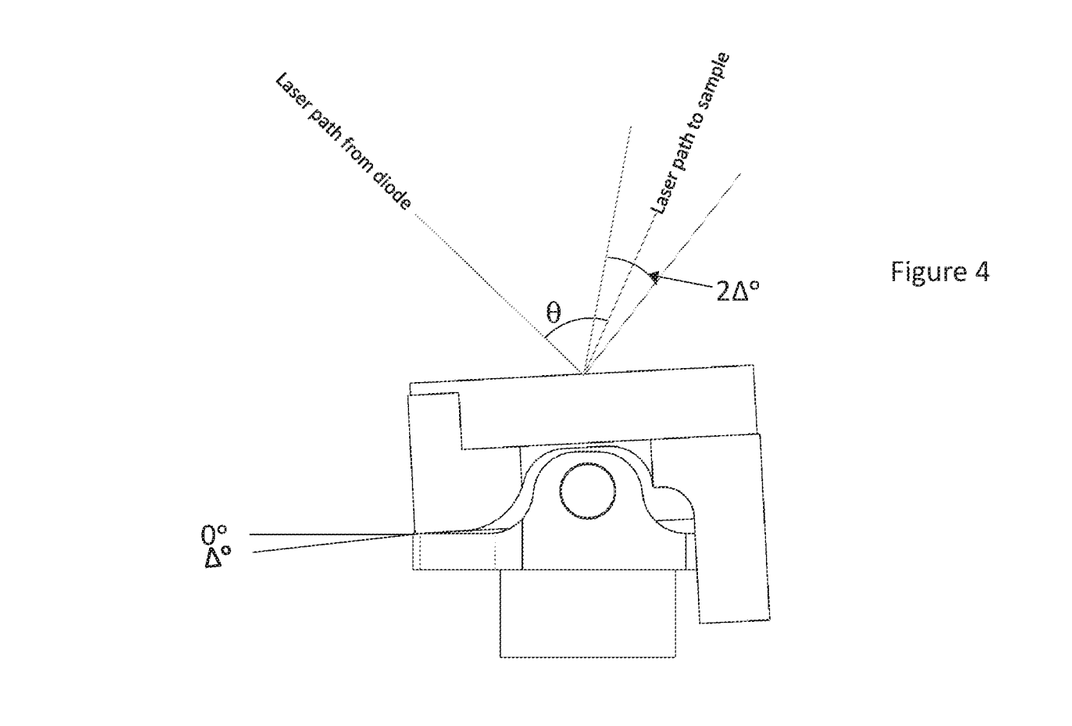
FIG. 4 shows a schematic diagram of the actuator assembly shown in FIGS. 2 and 3 in a dynamic configuration.

FIG. 4 shows the actuator assembly 60 of FIGS. 2 and 3 in a dynamic configuration (e.g., with a drive shaft of a raster motor spinning the base mount of the assembly 60). In this example, the mirror mount rotates to an angle Δ (e.g., a pre-set angle Δ) as shown in FIG. 4. By the combination of changing the angle of the reflecting surface to this angle Δ combined with the rotation of the entire actuator assembly, the excitation incident beam will be projected in a generally circular pattern providing a raster effect for better sample coverage.

Figure 5:
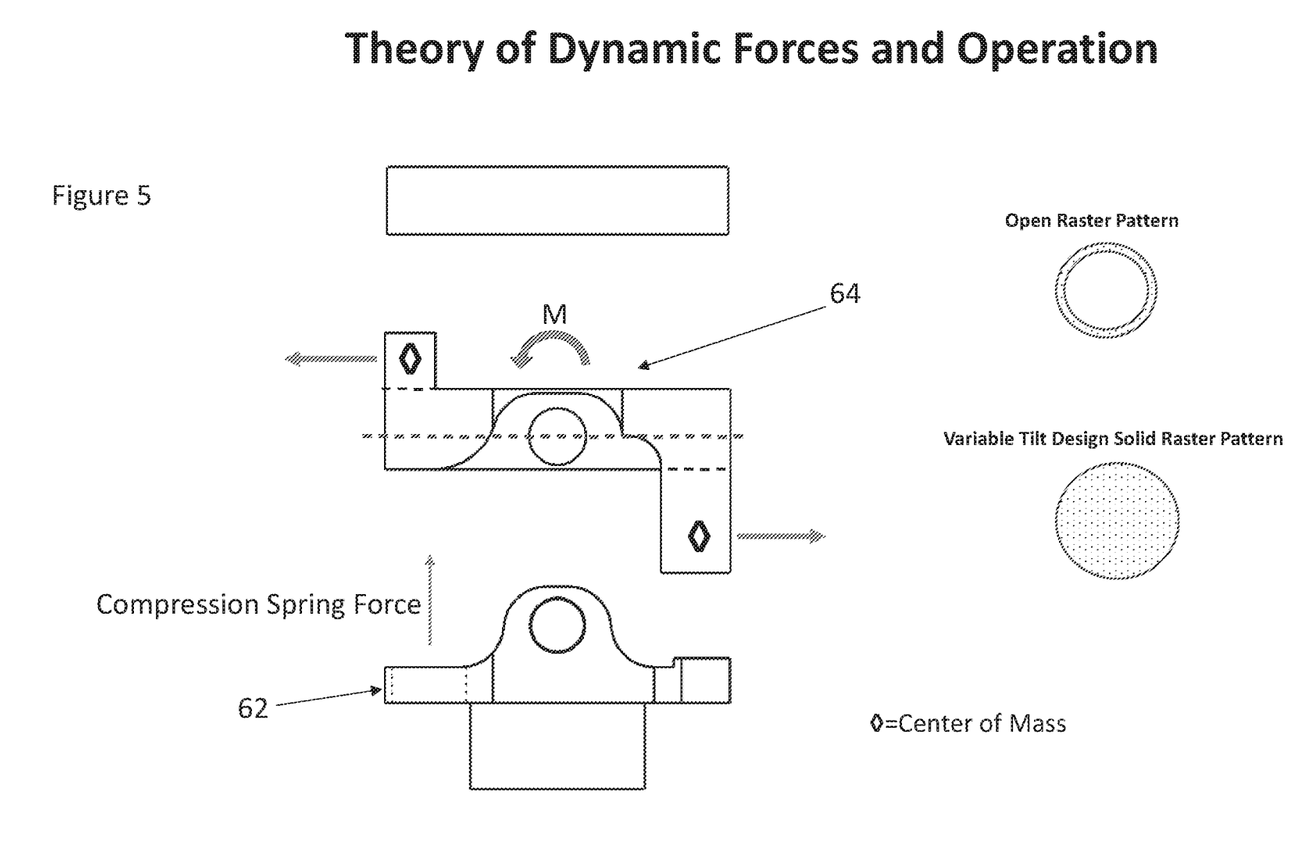
FIG. 5 shows a schematic diagram illustrating various example movements that contribute to the operation of the actuator assembly shown in FIGS. 2-4.

FIG. 5 shows various example movements that contribute to the operation of the actuator assembly 60 shown in FIGS. 2-4. In FIG. 5, for example, the mirror mount 64 is designed such that once the raster motor spins the mount up to a specific rotational speed, the two noted centers of mass of the mirror mount will cause a centripetal force reaction and, in turn, create a moment (M) about a hinge pin coupling the mirror mount 64 to the base mount 62. The actuator assembly is then driven by gyroscopic force. Once the moment force overcomes the counter-acting force applied by the compression spring, the mirror mount 64 will rotate creating an angle no longer perpendicular to the base mount (or an angle different from the angle generated when the raster motor is stationary).

Further, if the hinge of the base mount is designed with a stop to limit the maximum angle the mirror surface can tilt, the rotational speed of the raster motor can be changed to achieve different tilt angle positions. This, in turn, allows a speed sequence to be used to create a completely solid (or partially solid (e.g., steps)) raster pattern covering even more of a sample surface. FIG. 5 also shows example raster patterns.

Figure 6:
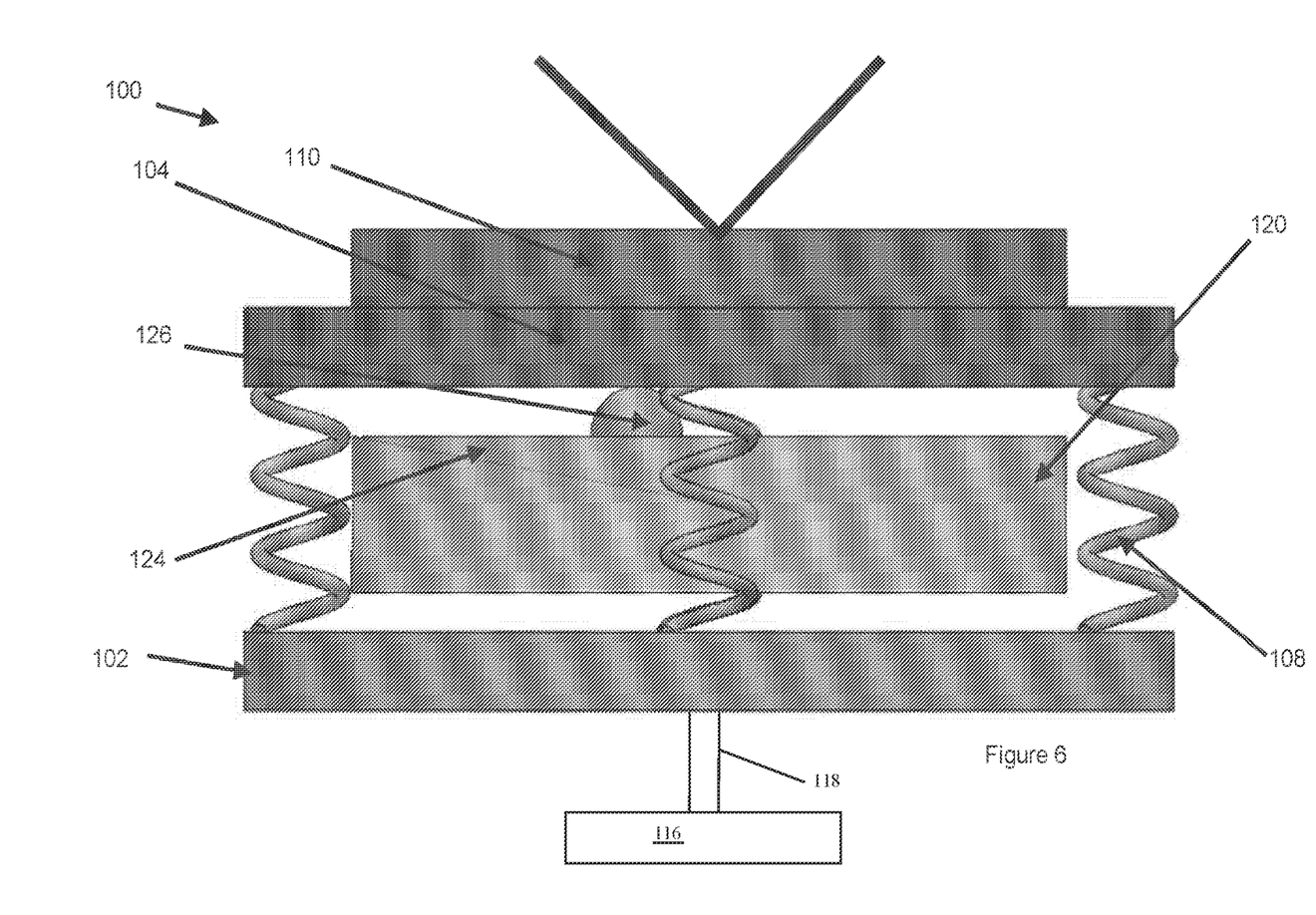
FIG. 6 shows a schematic diagram of another example embodiment of an actuator assembly configured to move an incident beam of a spectrometer across a surface of a sample.

FIG. 6 shows another example embodiment of an actuator assembly 100 configured to move an incident beam of a spectrometer across a surface of a sample. The actuator assembly 100, for example, may move one or more elements of an optical system of the spectrometer to scan, raster or otherwise move the incident beam across the surface of the sample.

The actuator assembly 100 includes a base mount 102 and a mirror mount 104 separated by a plurality of spring elements 108 disposed between the base mount 102 and the mirror mount 104. A mirror 110 or other reflective surface is disposed on the mirror mount 104 and is configured for reflecting an incident beam toward a sample and/or reflecting a spectrometer signal received from a sample toward an optical system of a spectrometer. A rotation plate 120 is also disposed between the base mount and the mirror mount. The rotation plate may also be coupled to a motor shaft 118 (or otherwise configured to rotate in response to a motor 116). A recess 122 is provided in the rotation plate juxtaposed a side of the mirror mount opposite the surface on which the mirror 110 is mounted (in this case an underside of the mirror mount). The recess, in this particular implementation, includes a ramp 124 on which a ball bearing 126 or other element may slide along as the rotation plate 120 is spun or stopped by a raster motor coupled to the rotation plate 120.

Figure 7:
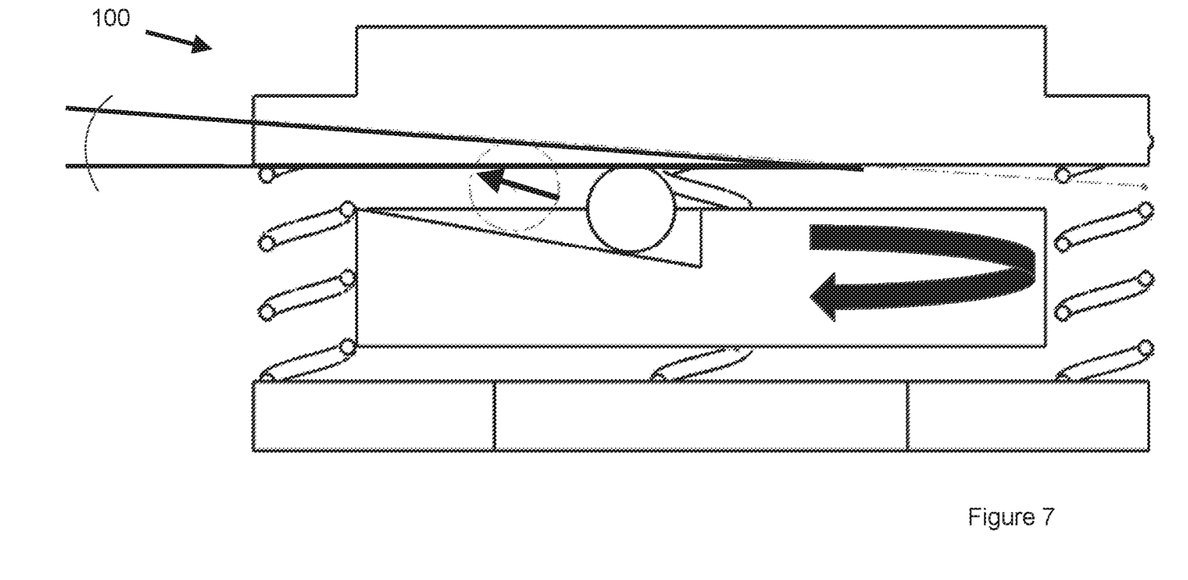
FIG. 7 shows a schematic an example operation of the actuator assembly shown in FIG. 6 as a raster motor is stationary or moving.

FIG. 7 shows an example operation of the actuator assembly 100 shown in FIG. 6 as the raster motor is stationary or speeds up. In this example, if the raster motor is stationary and not spinning, the rotation plate remains stationary and the ball bearing remains at the bottom of the ramp and does not contact the mirror mount (e.g., remains spaced from the underside of the mirror mount). Although a ball bearing is shown in FIG. 7, any other shape or device that is configured to move under similar forces (e.g., a rolling cylinder, sliding spacer or the like) may be used in a similar manner.

In this scenario, the mirror mount and the mirror/reflective surface remain flat and allow the excitation incident beam to reflect in a straight line. As the raster motor begins to turn the rotation plate, centrifugal forces displace the ball bearing outward and, in turn, up the ramp. The ball bearing comes into contact with the surface of the mirror mount and tilts the mirror mount and the mirror/reflective surface mounted thereto as the ball bearing moves farther up the ramp. In various implementations, the motion of the mirror allow the device to direct a beam in any number of solid, intermittent or other patterns.

Figure 8:
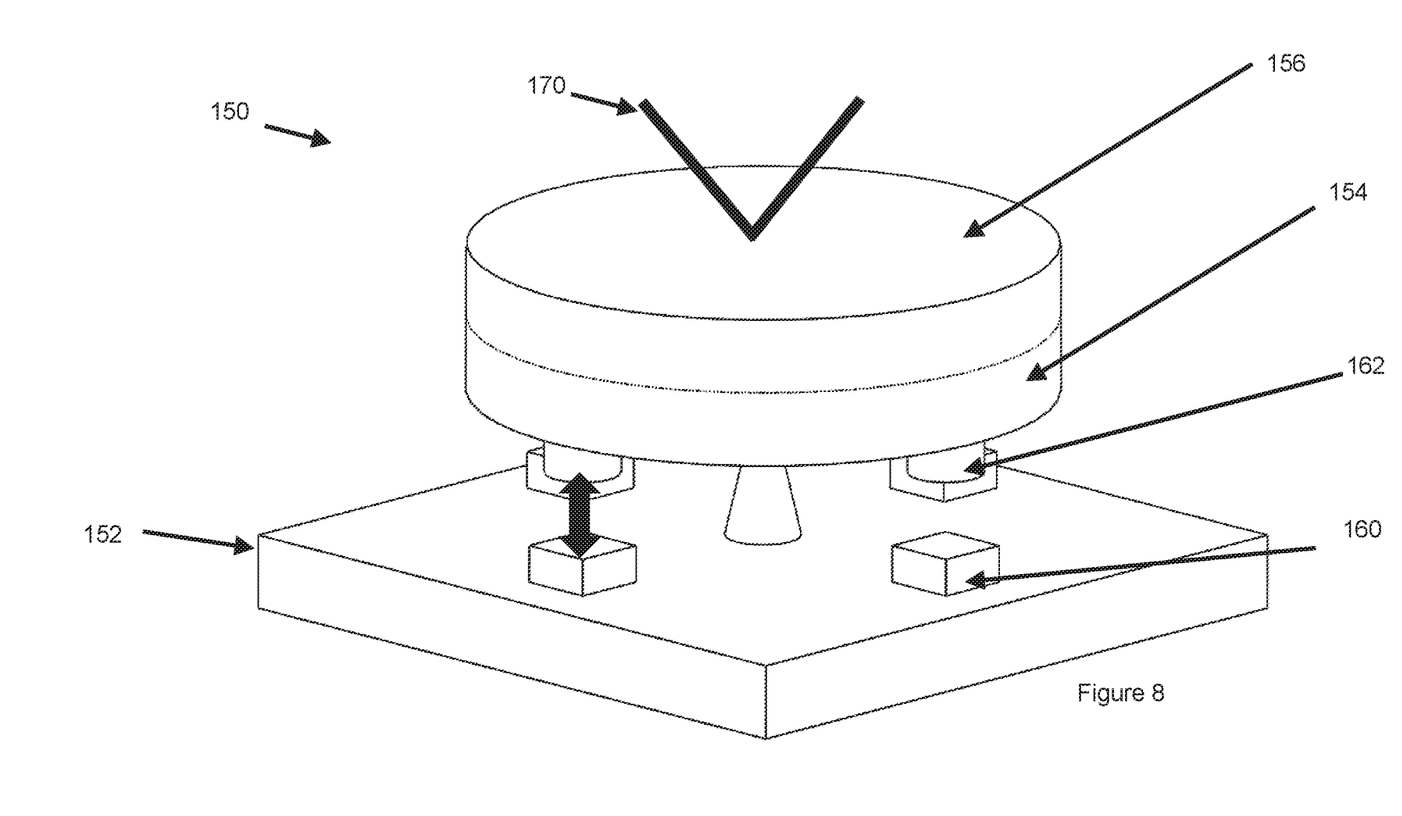
FIG. 8 shows a schematic diagram of yet another example implementation of an actuator assembly configured to move an incident beam of a spectrometer across a surface of a sample

FIG. 8 shows yet another example implementation of an actuator assembly 150 configured to move an incident beam of a spectrometer across a surface of a sample. The actuator assembly 150, for example, may move one or more elements of an optical system of the spectrometer to scan, raster or otherwise move the incident beam across the surface of the sample.

In this implementation, for example, the actuator assembly 150 includes a base mount 152 on which a plurality of electromagnet elements 160 are disposed. In one implementation, for example, the magnetic polarization state of each of the electromagnet elements is individually switchable (e.g., from positive to negative or from negative to positive). In other implementations, for example, the electromagnet elements may be controllable in groups to control the position of a mirror mount. A mirror mount 154 is pivotally mounted to the base mount. A plurality of fixed polarization magnets 162 is also disposed on the underside of the mirror mount 152 generally opposite the plurality of electromagnet elements disposed on the base mount. A mirror 156 or other reflective surface is disposed on an opposite side of the mirror mount from the fixed polarization magnet elements. By controlling the polarization of the electromagnet elements 160 disposed on the base mount, the actuator assembly may alter the angle of the mirror mount 154 and the mirror 156 or other reflective surface mounted thereto to alter a reflective angle 170 of an excitation incident beam from the spectrometer and/or a spectroscopy sample received from the sample.

Although in the particular implementation of FIG. 8, the electromagnet elements are shown disposed on the base mount and the fixed polarization magnet elements on the mirror mount, the elements may also be reversed in whole or in part. Further although implementations shown in FIGS. 2-8 include separate mirror mount structures and mirrors/reflective surfaces, the mirror mount itself may include a mirror or other reflective surface without requiring a separate element.

Although implementations of this invention have been described above with a certain degree of particularity, those skilled in the art could make numerous alterations to the disclosed embodiments without departing from the spirit or scope of this invention. For example, the optical systems described herein may be used in any number of optical systems, including but not limited to spectrometers. In addition, the optical systems may be disposed in a spectrometer or other optical system internal to or external to a focusing lens or mirror of the system such as described in the '678 patent incorporated by reference herein. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A self-homing or self-centering optical system comprising:
   a base mount;
   a mirror mount comprising a first surface and a second surface;
   at least one spring element disposed between the base mount and the mirror mount, the at least one spring adapted to bias the mirror mount with respect to the base mount;
   a rotation plate disposed between the base mount and the mirror mount, the rotation plate comprising a pressure element disposed adjacent the first surface of the mirror mount, the rotation plate coupled to a motor and adapted to rotate relative to the mirror mount and to move the pressure element across the first surface of the mirror mount;
   wherein in a first, stationary mode, the at least one spring provides a bias force to maintain a reflective surface associated with the second surface of the minor mount at a generally consistent home angle, and in a second, dynamic scanning mode, the rotation plate is adapted to rotate with respect to the minor mount and to move the pressure element in contact with the minor mount to overcome the bias of the at least one spring and to dynamically move the reflective surface.

2. The optical system of claim 1 wherein the reflective surface is coupled to or formed with the mirror mount.

3. The optical system of claim 1 wherein at least one of the rotation plate and the mirror mount comprises a recess configured to house the pressure element.

4. The optical system of claim 3 wherein in the second, dynamic a mode, the pressure element is adapted to move within the recess and provide a counteracting force to alter the angle of the reflective surface from the home angle as the rotation plate continues to rotate relative to the mirror mount.

5. The optical system of claim 4 wherein the pressure element is configured to move under centrifugal force as the rotation plate is rotated and apply a pressure to the first surface of the mirror mount.

6. The optical system of claim 1 wherein the pressure element comprises a ball bearing.

7. The optical system of claim 6 wherein the rotation plate comprises a ramp, the ball bearing being disposed within the ramp between the rotation plate and the first surface of the mirror mount.

* * * * *